(12) United States Patent
Ulman et al.

(10) Patent No.: US 9,922,035 B1
(45) Date of Patent: Mar. 20, 2018

(54) DATA RETENTION SYSTEM FOR A DISTRIBUTED FILE SYSTEM

(71) Applicant: EMC Corporation, Hopkinton, MA (US)

(72) Inventors: Aditya Ulman, Bangalore (IN); Priyank Tripathi, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 172 days.

(21) Appl. No.: 14/675,022

(22) Filed: Mar. 31, 2015

(51) Int. Cl.
  *G06F 17/00* (2006.01)
  *G06F 17/30* (2006.01)

(52) U.S. Cl.
  CPC .. *G06F 17/30085* (2013.01); *G06F 17/30203* (2013.01)

(58) Field of Classification Search
  CPC ......... G06F 17/30085; G06F 17/30203; G06F 17/30

USPC ................................................. 707/600–899
See application file for complete search history.

(56) References Cited

U.S. PATENT DOCUMENTS

2008/0140947 A1* 6/2008 Slik ....................... G06F 3/0605
  711/154

\* cited by examiner

*Primary Examiner* — Isaac M Woo
(74) *Attorney, Agent, or Firm* — Chamberlain Hrdlicka

(57) ABSTRACT

A method and system for implementing data retention policies on data stored within distributed file systems. Embodiments of the technology enable a content object retention management controller to apply a data retention policy on sets of content objects stored on a distributed file system via a single proxy object. In one or more embodiments of the technology, the request to apply the data retention policy on the single proxy object ultimately propagates the application of the data retention policy to the set of associated content objects (and, as appropriate, directories) stored in the distributed file system. In one or more embodiments of the technology, a content object may be a file (or any portion thereof) and/or a directory (or any portion thereof).

20 Claims, 12 Drawing Sheets

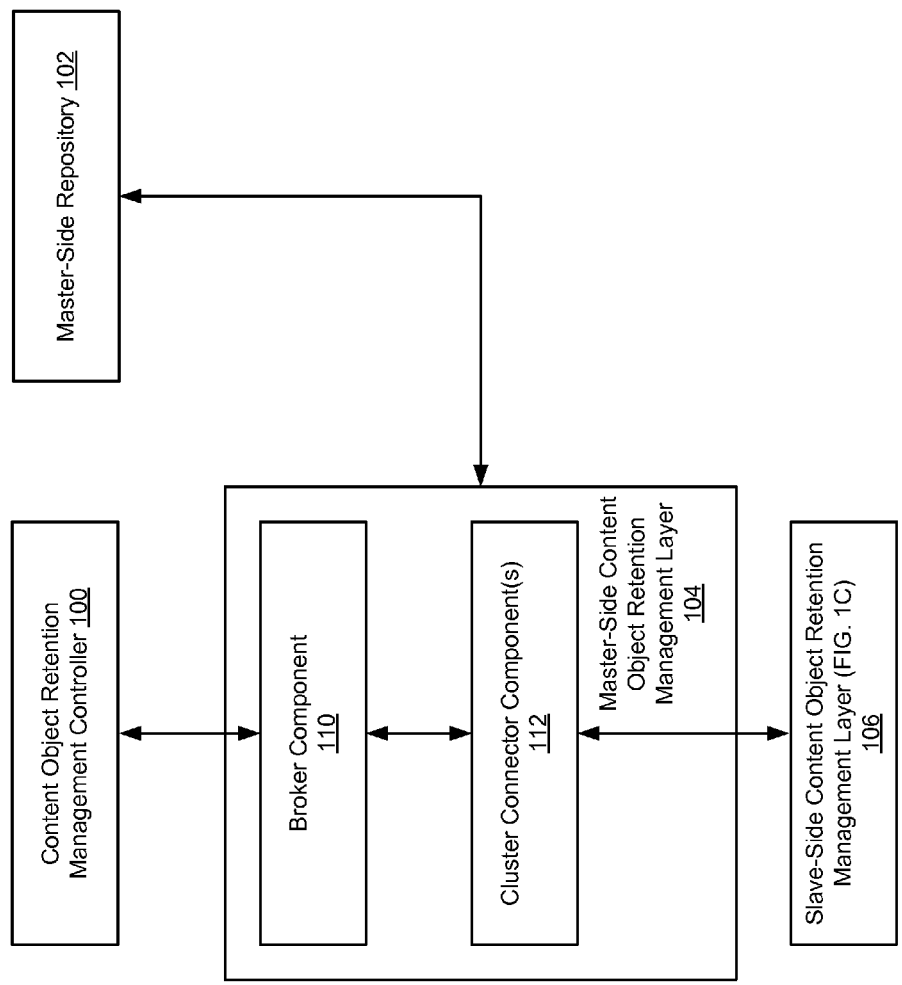

ered to store large amounts of data. Conventional approaches are not able to effectively implement data retention policies on the data within the distributed file systems.

DATA RETENTION SYSTEM FOR A DISTRIBUTED FILE SYSTEM

BACKGROUND

Distributed file systems are being used to store large amounts of data. Conventional approaches are not able to effectively implement data retention policies on the data within the distributed file systems.

BRIEF DESCRIPTION OF DRAWINGS

FIGS. 1A-1C show a system in accordance with one or more embodiments of the technology.

DETAILED DESCRIPTION

Figure 1A:
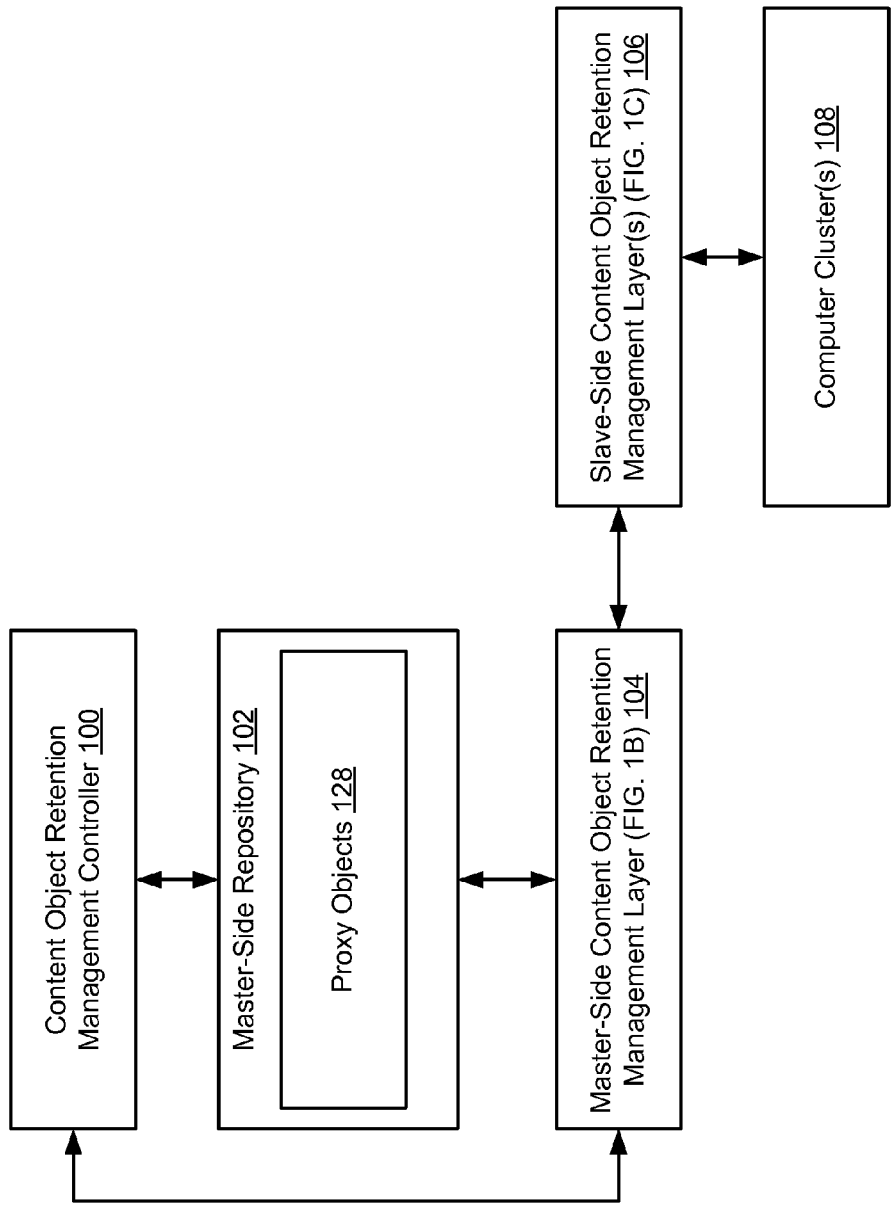

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the technology relate to a method and system for implementing data retention policies on data stored within distributed file systems (e.g., in a Hadoop Distributed File System). Embodiments of the technology enable a content object retention management controller to apply a data retention policy on sets of content objects stored on a distributed file system via a single proxy object. In one or more embodiments of the technology, the request to apply the data retention policy on the single proxy object ultimately propagates the application of the data retention policy to the set of associated content objects (and, as appropriate, directories) stored in the distributed file system. In one or more embodiments of the technology, a content object may be a file (or any portion thereof) or a directory (or any portion thereof). Further, the file may include any combination of data or metadata.

In one embodiment of the technology, the data retention policy corresponds to any policy that may be used to preserve a content object (or set of content objects) stored in a distributed file system. Preserving the content object (or set of content objects) may include (i) preventing the content object from being modified and/or (ii) preventing deletion of the content object. The data retention policy may indicate that a content object (or set of content objects) is not to be deleted for a specified period of time (i.e., a retention period) or that a content object is not to be deleted where there is no time period specified for when deletion is appropriate.

Figure 1C:
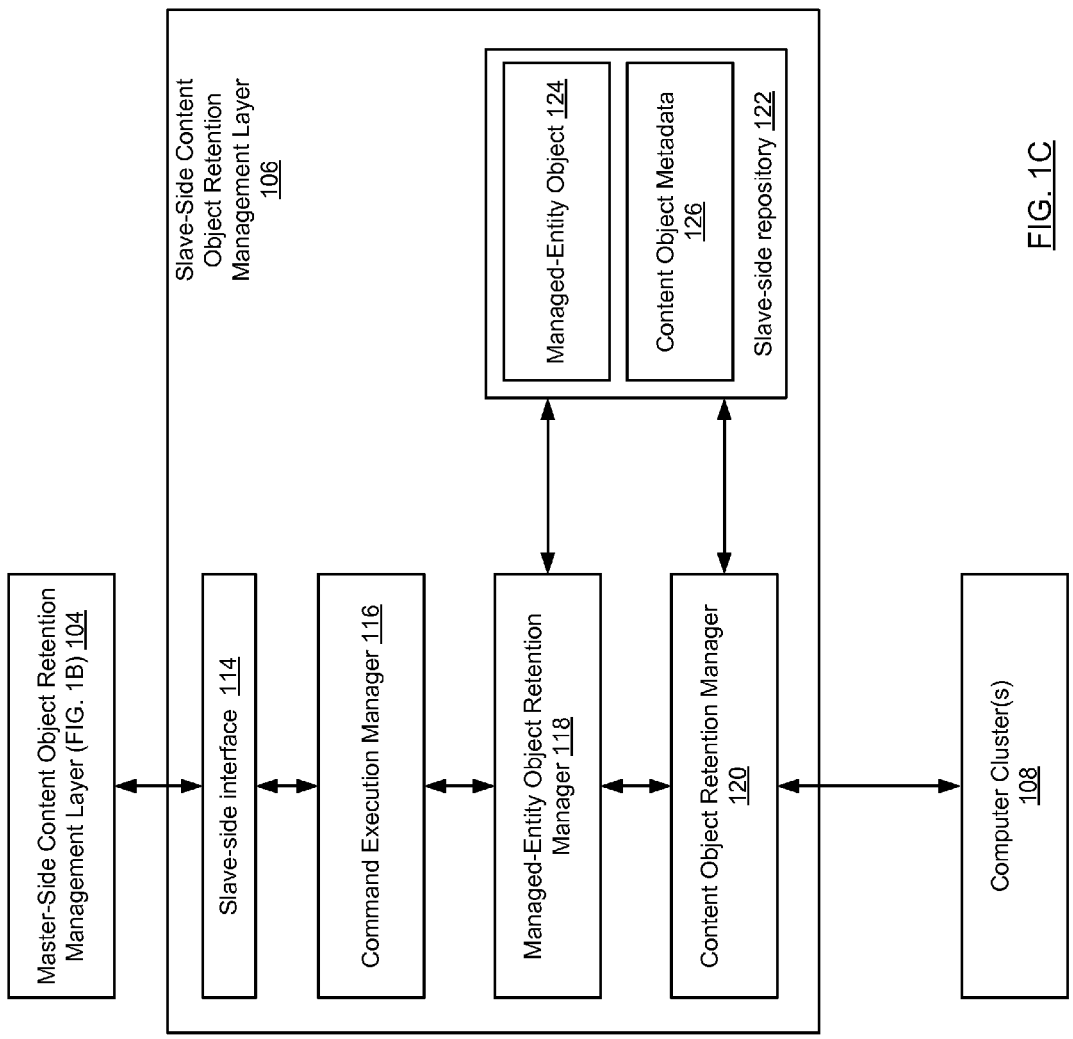

FIGS. 1A-1C show a system in accordance with one or more embodiments of the technology. The system includes a content object retention management controller (100), a master-side repository (102), a master-side content object retention management layer (104), a slave-side content object retention management layer (106), and a computer cluster (108). Each of these components is described below.

Figure 8:
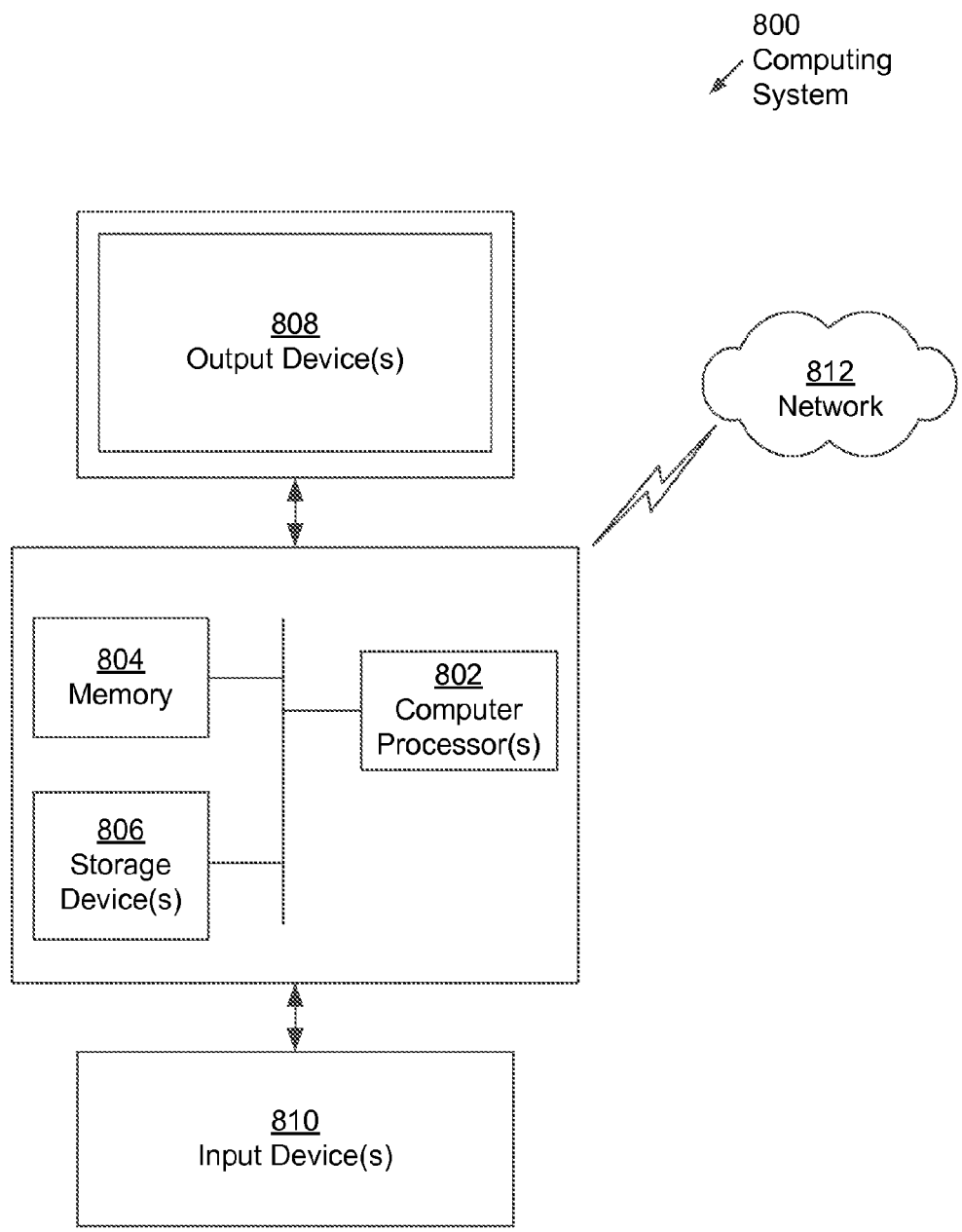
FIG. 8 shows an example computing system in accordance with one or more embodiments of the technology.

In one embodiment of the technology, each of the components shown in FIG. 1A may be implemented on one or more computer systems, for example, the computer system shown in FIG. 8. Alternatively, two or more of the aforementioned components may be implemented on a single computer system (see e.g., FIG. 8) while other components shown in FIG. 1A may be implemented on multiple computer systems (see e.g., FIG. 8). In one or more embodiments of the technology, the computer systems (not shown) upon which one or more of the aforementioned components are located may communicate using any combination of wired and/or wireless communication mechanisms.

In one embodiment of the technology, the content object retention management controller (100) is the component used by the system administrator to implement various embodiments of the technology. More specifically, the content object retention management controller (100) provides an interface (e.g., a graphical user interface and/or a command line interface) through which the system administrator (or another individual) may perform or initiate the methods shown in FIGS. 4-6. More specifically, in one embodiment of the technology, the content object retention management controller (100) enables a system administrator (or another user) to specify a data retention policy on a proxy object. Once a data retention policy has been specified for the proxy object, the content object retention management controller (100) may include functionality to: (i) obtain the proxy object from the master-side repository (102), (ii) apply the data retention policy to the proxy object (e.g., update the proxy object to indicate that the data retention policy has been applied to the proxy object, wherein the updated proxy object is maintained in-memory until (iv) occurs), (iii) initiate the implementation of the data retention policy on the associated content objects stored in a computer cluster (108), (iv) store the updated proxy object in the master-side repository upon confirmation that the data retention policy has been successfully applied to the associated content objects (if the data retention policy is not successfully applied to the associated content objects in the computer cluster, then (iv) is not performed).

In one or more embodiments of the technology, the content object retention management controller (100) also includes functionality to de-register proxy objects, to remove previously applied data retention policies from registered proxy objects (which ultimately removes the data retention policy from the corresponding content objects), and to delete registered proxy objects (which ultimately deletes the corresponding content objects in the case that the content objects are not protected by any other data retention policy) on expiry of the retention period.

In one embodiment of the technology, the master-side repository (102) includes persistent storage and a mechanism (e.g., a database management system) to enable the content object retention management controller (100) and the master-side content object retention management layer (104) to access data stored within the master-side repository (102). In one embodiment of the technology, the master-side repository includes one or more proxy objects (128) and one or more configuration objects (not shown). Additional detail about the proxy objects and the configuration objects is provided below with reference to FIG. 2A.

In one embodiment of the technology, the master-side content object retention management layer (104) provides an interface between the content object retention management controller and the slave-side content object retention management layer (106). More specifically, in one embodiment of the technology, the master-side content object retention management layer (104) includes functionality to convert the master command (see e.g., FIG. 5, step 506) into slave command that may be performed by the slave-side content object retention management layer (106). The master-side content object retention management layer (104) also includes functionality to translate responses received from the slave-side content object retention management layer (106) into responses that may be provided to the content object retention management controller (100). Additional details about the master-side content object retention management layer (104) may be found in FIG. 1B and FIGS. 4-6.

In one embodiment of the technology, the slave-side content object retention management layer (106) provides an interface between the master-side content object retention management layer (106) and the computer clusters (108). More specifically, in one embodiment of the technology, the slave-side content object retention management layer (106) includes functionality to process the slave command to ultimately instruct the computer cluster (108) to apply the data retention policy on the content objects in the computer cluster (see e.g., FIG. 5). The slave-side content object retention management layer (106) also includes functionality to translate responses received from the computer cluster (108) into responses that may be provided to the master-side content object retention management layer (104). Additional details about the slave-side content object retention management layer (106) may be found in FIG. 1C and FIGS. 4-6.

In one embodiment of the technology, a computer cluster includes two or more servers (also referred to as nodes or physical nodes). In one or more embodiments of the technology, the cluster may implement a distributed file system such as Hadoop Distributed File System (HDFS). In such cases, each cluster includes a single NameNode server (also referred to as NameNode) (or two NameNode servers if the NameNode servers are part of a high availability pair) and one or more DataNode servers (also referred to as DataNodes). In one embodiment of the technology, the NameNode maintains a directory tree of all files in the cluster with which it is associated. In addition, the NameNode tracks the location of all files (or portions thereof) in the DataNode servers in the cluster. This information is stored as metadata on the NameNode server. The NameNode may implement the aforementioned functionality using a distributed file system. In one embodiment of the technology, a DataNode server is part of the distributed file system. The DataNode server is configured to service file system requests (e.g., read request, write request, etc.) for data that is locally stored on the DataNode server. In one or more embodiments of the technology, a given system, such as the one in FIG. 1A, may concurrently implement one or more clusters.

While FIG. 1A shows a configuration of components, other configurations may be used without departing from the scope of the technology. For example, various components may be combined to create a single component. As another example, the functionality performed by a single component may be performed by two or more components.

FIG. 1B shows a master-side content object retention management layer (104) in accordance with one or more embodiments of the technology. The master-side content object retention management layer (104) includes a broker component (110) and a cluster connector component (112). Each of these components is described below.

In one embodiment of the technology, the broker component (110) is configured to receive master commands from the content object retention management controller (100) and determine, using information in the proxy object, which cluster connector component (112) of the set of cluster connector components to forward the master command. More specifically, the master-side content object retention management layer (104) may be connected to multiple slave-side content object retention management layers (106) where each of the slave-side content object retention management layers (106) is connected to its own distinct computer cluster. In such scenarios, there is a specific cluster connector component for each of the slave-side content object retention management layers (106). The broker component uses information in the proxy object to select the appropriate cluster connector component. The broker component (110) may also include functionality to receive responses from the various cluster connector components and provide the responses to the content object retention management controller. Additional detail about the broker component may be found, for example, in FIG. 5.

Each cluster connector component (112) includes functionality to: (i) receive master commands from the broker component (110), (ii) generate slave commands that correspond to the master command, (iii) send the generated slave commands to the appropriate slave-side content object retention management layer, (iv) receive results of execution of the slave commands from the slave-side content object retention management layer, and (v) provide results (in the form of a response) to the broker component. Additional detail about the cluster connector component may be found, for example, in FIG. 5.

The components within the master-side content object retention management layer (104) may be located on a single computer system (see e.g., FIG. 8) or on multiple computer systems (see e.g., FIG. 8) without departing from the technology.

FIG. 1C shows a slave-side content object retention management layer (106) in accordance with one or more embodiments of the technology. The slave-side content object retention management layer includes a slave-side interface (114), a command execution manager (116), a managed-entity object (MEO) retention manager (118), a content object (CO) retention manager (120), and a slave-side repository (122). Each of these components is described below.

In one embodiment of the technology, the slave-side interface (114) corresponds to the communication interface that permits the slave-side content object retention management layer (106) to receive slave commands from the master-side content object retention management layer (104) and to provide results to the master-side content object retention management layer (104).

In one embodiment of the technology, the command execution manager (116) includes functionality to process the slave commands received from the master-side content object retention management layer (104) and generate instructions for the MEO retention manager (118) to execute. The command execution manager also includes functionality to receive, in response to the instructions, results from the MEO retention manager and return these results back to the master-side content object retention management layer (via the slave-side interface (114)). Additional detail about the execution of the command execution manager (118) is provided below in FIG. 5.

In one embodiment of the technology, the MEO retention manager (118) includes functionality to: receive instructions from the command execution manager (116), perform the instructions, and provide responses to the command execution manager (116). As discussed in FIG. 5 below, performing the instructions may include, for example, obtaining managed-entity objects (MEOs) from the slave-side repository (122), performing various operations using the information in the MEOs, issuing appropriate instructions to the CO retention manager (120) (discussed below), receiving, in response to issued instructions, results from the CO retention manager (120), updating (as appropriate) the MEOs, committing the updated MEOs to the slave-side repository. Additional detail about the execution of the MEO retention manager is provided below in FIG. 5.

In one embodiment of the technology, the CO retention manager (120) includes functionality to: receive instructions from the MEO retention manager (118), perform the instructions, and to return results to the MEO retention manager. As discussed in FIGS. 5 and 6 below, performing the instructions may include, for example, obtaining content object metadata from the slave-side repository (122), performing various operations using the information in the content object metadata, updating (as appropriate) the content object metadata (126), and committing the updated content object metadata to the slave-side repository. The CO retention manager (120) may also include functionality to issue instructions to the computer cluster (108) in order to perform one or more of the following actions/operations on the content objects: protecting content objects from modification or deletion, removing protection from content objects (e.g., enabling the content objects to the modified and/or deleted), deleting content objects from the computer cluster. Additional detail about the execution of the CO retention manager is provided below in FIGS. 5 and 6.

In one embodiment of the technology, the slave-side repository (122) includes persistent storage and a mechanism (e.g., a database management system) to enable the MEO retention manager (118) and the CO retention manager (120) to access data stored within the slave-side repository (122). In one embodiment of the technology, the slave-side repository includes one or more managed-entity objects (124) and content object metadata (126) for one or more content objects. Additional detail about the managed-entity objects is provided below in FIG. 2B. Additional detail about the content object metadata is provided below in FIG. 2C. While FIG. 1C shows a slave-side repository that includes both managed-entity objects (124) and content object metadata, embodiments of the technology may be implemented in which the slave-side content object retention management layer (106) includes two slave-side repositories—one slave-side repository that includes only managed-entity objects (124) and one slave-side repository that only includes content object metadata (126).

The components within the slave-side content object retention management layer (106) may be located on a single computer system (see e.g., FIG. 8) or on multiple computer systems (see e.g., FIG. 8) without departing from the technology.

Figure 2A:
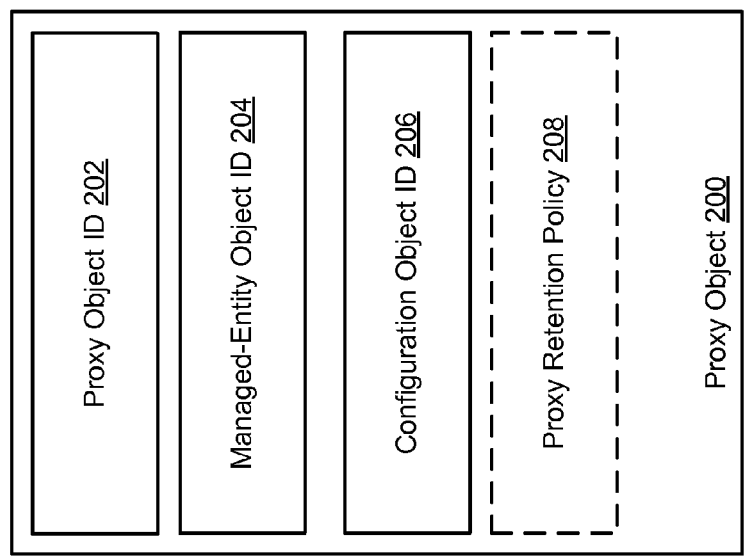
FIG. 2A shows an example of a proxy object in accordance with one or more embodiments of the technology.

FIG. 2A shows an example of a proxy object in accordance with one or more embodiments of the technology. The proxy object (200) may include a proxy object identifier (202), which uniquely identifies the proxy object and is used by the administrator to identify the proxy object. The proxy object (200) may also include the managed-entity object ID (204 in FIG. 2B) which uniquely identifies the corresponding managed-entity object (210) and a configuration object ID (206), which uniquely identifies a configuration object. In one embodiment of the technology, the configuration object (which is identified by the configuration object ID) includes information to enable the master-side content object retention management layer (104) to connect to the appropriate slave-side content object retention management layer (106), i.e., slave-side content object retention management layer that includes the MEO identified by the MEO ID in the proxy object. The configuration object may include, but is not limited to, (i) an Internet Protocol (IP) address of the Namenode (or the computer on which the Namenode is executing), (ii) login credentials for the computer cluster, (iii) protocol identification information (e.g., "HDFS"), and (iv) the port number through which the slave-side content object retention management layer may access the computer cluster. Further, the proxy object may include a proxy retention policy (208), which corresponds to the data retention policy the administrator has applied or is attempting to apply to the proxy object (200). The proxy object (200) may include other information without departing from the technology.

Figure 2B:
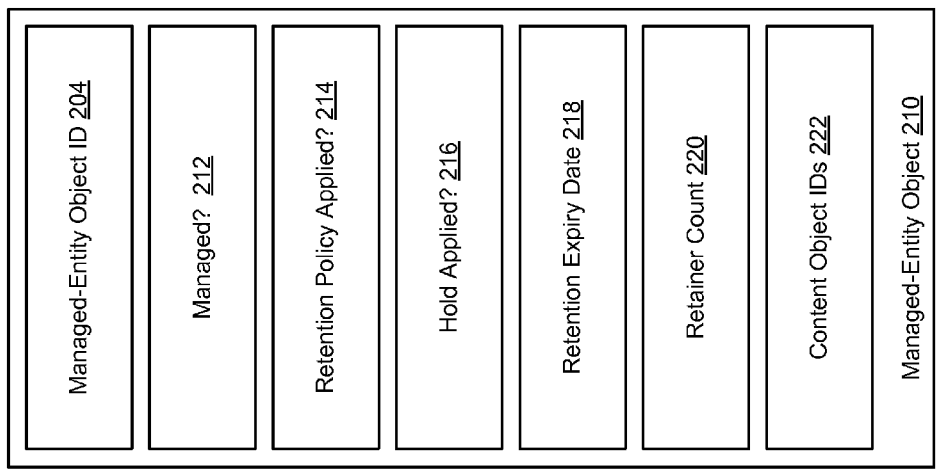
FIG. 2B shows an example of a managed-entity object in accordance with one or more embodiments of the technology.

FIG. 2B shows an example of a managed-entity object in accordance with one or more embodiments of the technology. The managed-entity object (210) may include the following components: (i) a managed-entity object identifier (204), which uniquely identifies the managed-entity object (210); (ii) a "managed?" attribute (212) that is used to indicate whether there is a proxy object that is registered with this managed-entity object (see e.g., FIG. 4 below); (iii) a "retention policy applied?" attribute (214) that is used to indicate whether at least one data retention policy has been applied to the managed-entity object (210); (iv) a "hold applied" attribute (216) that is used to indicate whether a hold has been applied to the managed-entity object (i.e., the managed-entity object is not to be deleted regardless of whether the retention expiry date (218) has passed); (v) a retention expiry date (218) that specifies when the data retention policy expires (or the latest expiration date of any of the applied data retention policies if more than one data retention policy applies); (vi) a retainer count (220) that specifies the number of data retention policies applied to the MEO (210); and (vii) a listing of one or more content object identifiers (IDs) (222) that includes the unique content object identifiers for the content objects associated with the managed-entity object (210). The managed-entity object (210) may include other information without departing from the technology.

Figure 2C:
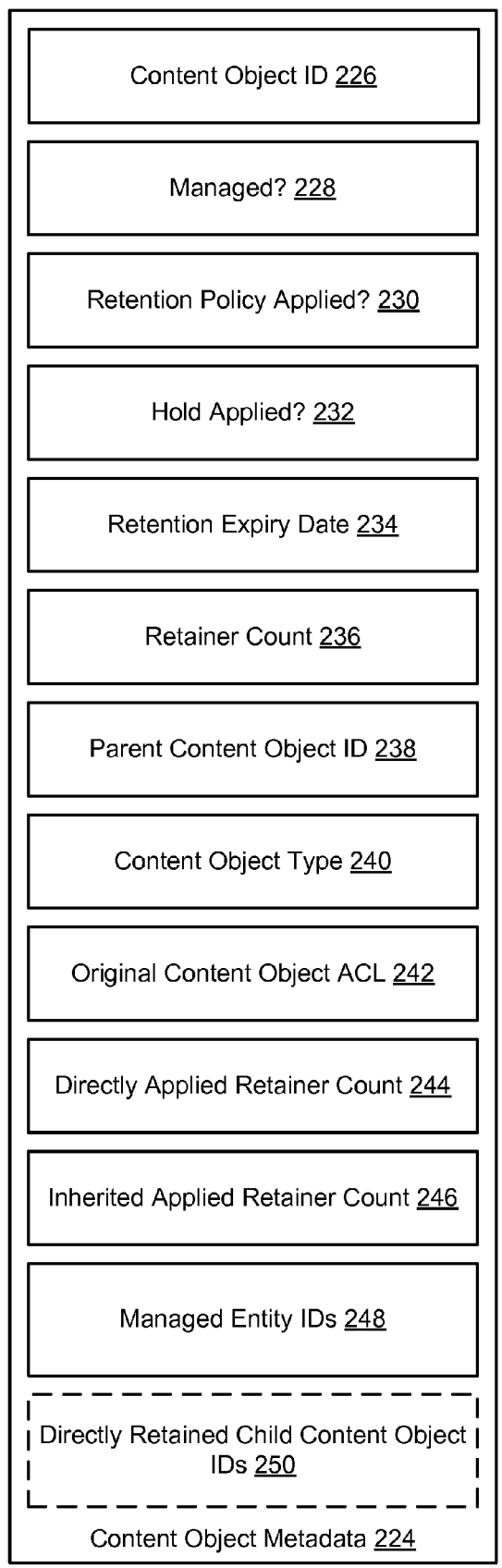
FIG. 2C shows an example of content object metadata in accordance with one or more embodiments of the technology.

FIG. 2C shows an example of content object metadata in accordance with one or more embodiments of the technology. The content object metadata (224) may include the following components: (i) a content object identifier (ID) (226) that uniquely identifies the content object that is associated with the content object metadata (224); (ii) a "managed?" attribute (228) that is used to indicate whether the content object is associated at least one managed-entity object with which a proxy object has been registered; (iii) a "retention policy applied?" attribute (230) that is used to indicate whether at least one data retention policy has been applied to the content object; (iv) a "hold applied?" attribute (232) that is used to indicate whether a hold has been applied to the content object (i.e., the content object is not to be deleted regardless of whether the retention expiry date (234) has passed); (v) a retention expiry date (234) that specifies when the data retention policy expires (or the latest expiration date of any of the applied data retention policies if more than one data retention policy applies); (vi) a retainer count (236) that specifies the number of data retention policies applied to the content object; (vii) parent content object ID (238) that indicates parent content object (e.g., a directory) for the content object associated with the content object ID (226); (viii) content object type (240) is used to specify the type of the content object (e.g., file, directory, etc.); (ix) original content object access control list (ACL) (242) includes the original ACL that is associated with the content object (e.g., which users/groups have read, write, and/or delete permissions, etc.); (x) directly applied retainer count (244) specifies the number of data retention policies that are directly applied to the content object (i.e., the number of data retention policies that are applied to the MEOs with which the content object is associated); (xi) inherited applied retainer count (246) specifies the number of data retention policies that have been applied to the content object because they were applied to direct and indirect parent content objects of the content object (e.g., when a data retention policy is applied to a parent content object that is a directory and the content object is located within the directory); (xii) a list of the managed-entity object IDs (248) that includes all the managed-entity object IDs for the managed-entity objects with which the content object (i.e., the content object identified by the content object ID (226)) is associated; and (xiii) a list of directly retained child content object IDs (250) that includes content object IDs for direct child content objects of the content object, when the content object is a directory and when a data retention policy has been applied directly to the child content object. The content object metadata (224) may include other information without departing from the technology.

Figure 3:
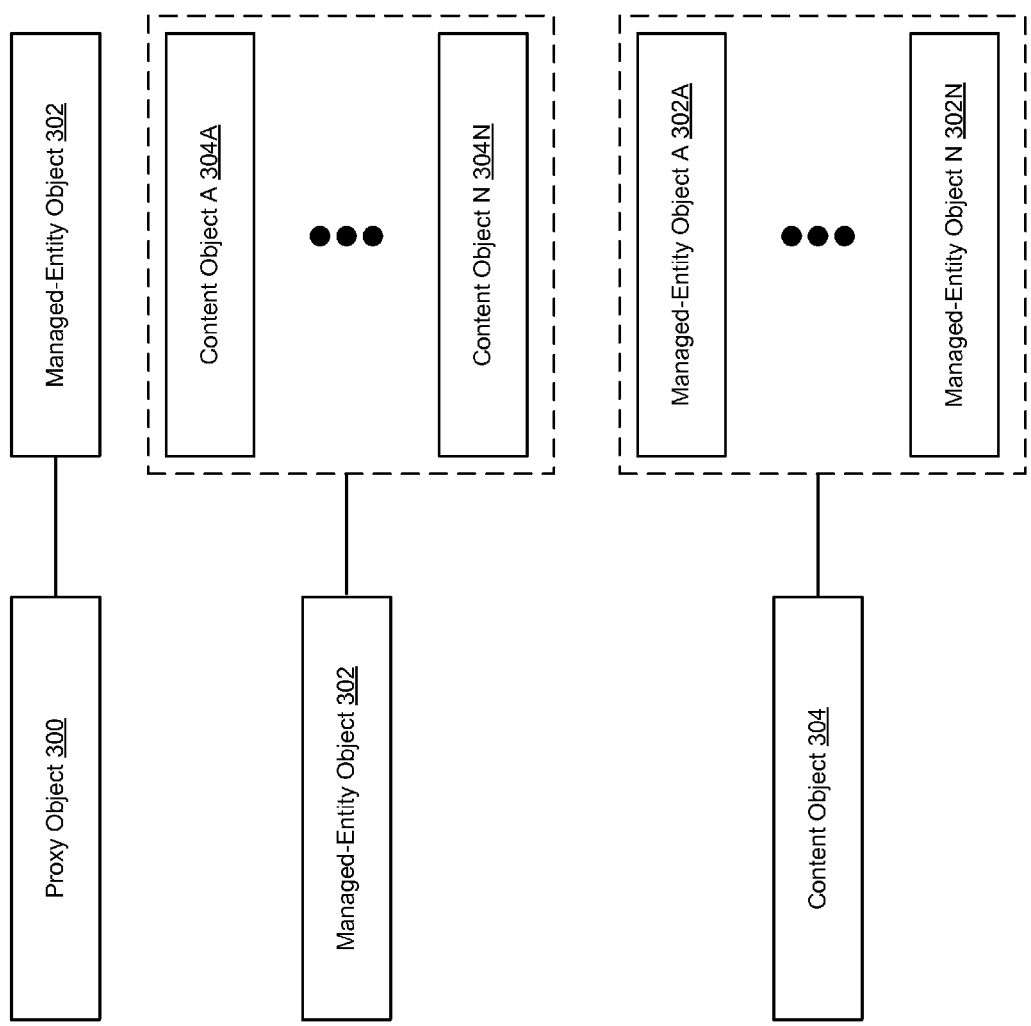
FIG. 3 shows relationships between the various objects in accordance with one or more embodiments of the technology.

FIG. 3 shows relationships between the various objects in accordance with one or more embodiments of the technology. In one embodiment of the technology, there is a 1:1 mapping between proxy objects (300) and managed-entity objects (302). Further, each managed-entity object (302) may be associated with one or more content objects (304A, 304N). Further, each content object (304) may be associated with one or more managed-entity objects (302A, 302M).

The following section describes various flowcharts in accordance with one or more embodiments of the technology. While the various steps in this flowchart are presented and described sequentially, one of ordinary skill will appreciate that some or all of the steps may be executed in different orders, may be combined or omitted, and some or all of the steps may be executed in parallel.

Figure 4:
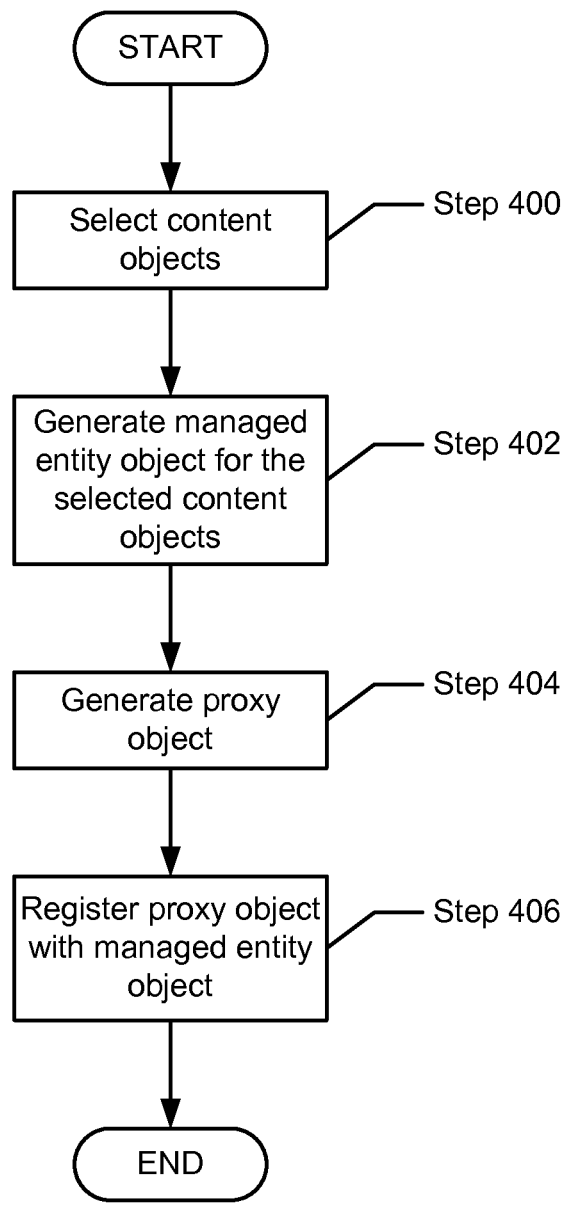
FIG. 4 shows a method for setting-up the data retention system in accordance with one or more embodiments of the technology.

FIG. 4 shows a method for setting-up the data retention system in accordance with one or more embodiments of the technology.

In step 400, content objects are selected. The selected content objects may be one or more content objects stored in the computer cluster. The selection of content objects may be performed using any known or later discovered mechanism. For example, a set of selected content objects may correspond to all content objects stored in the computer cluster on a given day. In another example, the set of selected objects may be all emails stored in the computer cluster that are related to a particular subject or that are addressed to a particular person or set of individuals. The result of the selection may be a list of content object identifiers (i.e., any combination of letters, numbers, and/or symbols) (e.g., "/poc/test3/test1.txt").

In step 402, a managed-entity object (MEO) is generated. In one embodiment of the technology, generating the MEO may include associating the MEO with a managed-entity object ID (204), setting the "managed?" attribute (212) to "false", setting the "retention policy applied?" attribute (214) to "false", setting the "hold applied?" attribute (216) to "false", setting the value associated with the retention expiry date (218) to "0", setting the retainer count (220) to "0", and including a list of content object IDs (222). The resulting MEO is then stored in the slave-side repository (122).

In step 404, a proxy object is generated. In one embodiment of the technology, generating the proxy object may include creating a proxy object, and storing the MEO ID (204) and the configuration object ID (206) in the proxy object.

In step 406, once the proxy object is generated for the MEO in step 404, the corresponding MEO (i.e., the MEO created in step 402) is updated to set the "managed?" attribute (212) to "true". At this stage, a data retention policy may be applied to the proxy object, which ultimately results in the application of the data retention policy on the corresponding content objects in the computer cluster.

Figure 5:
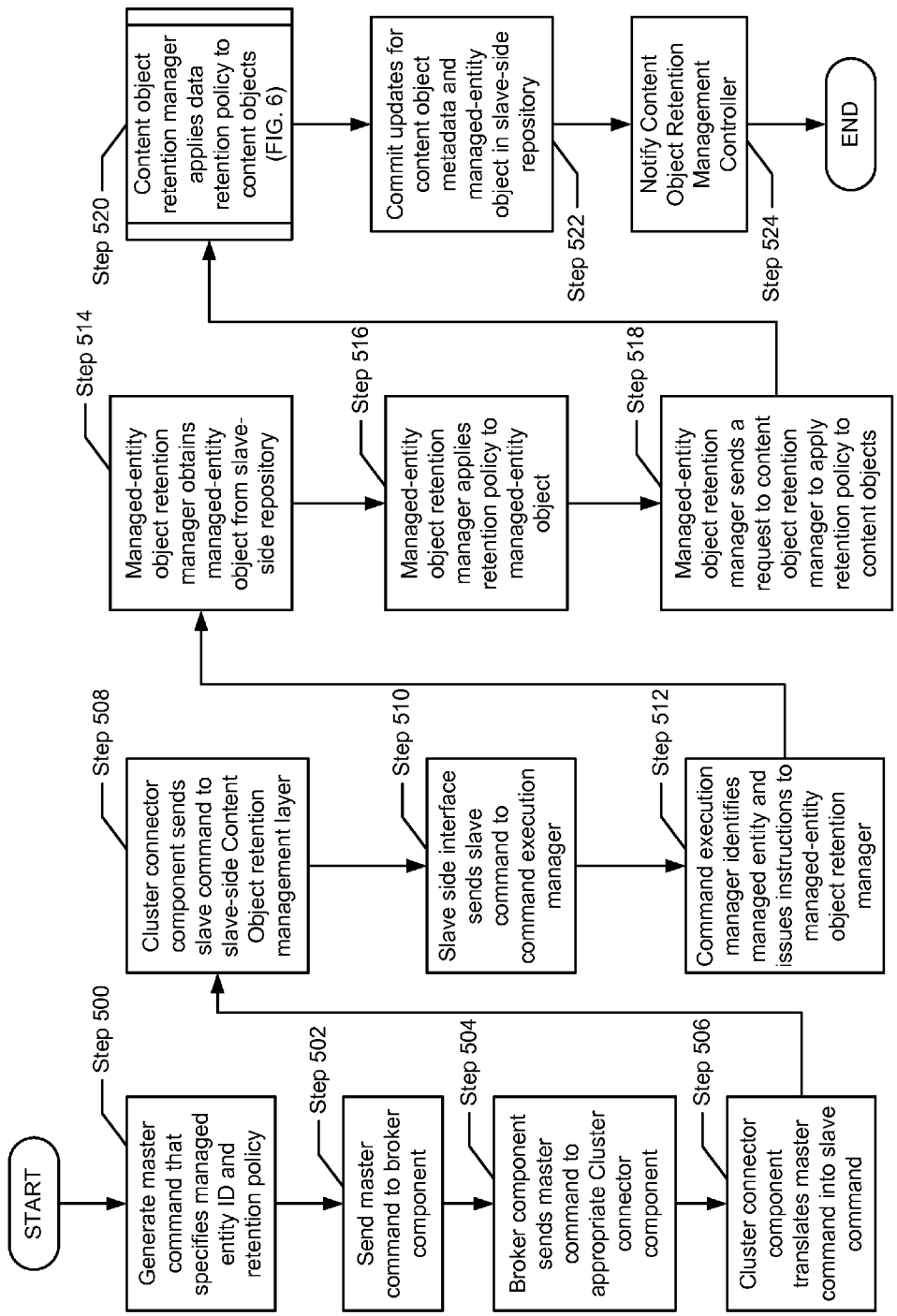
FIGS. 5 and 6 show a method for applying a data retention policy in accordance with one or more embodiments of the technology.
Figure 6:
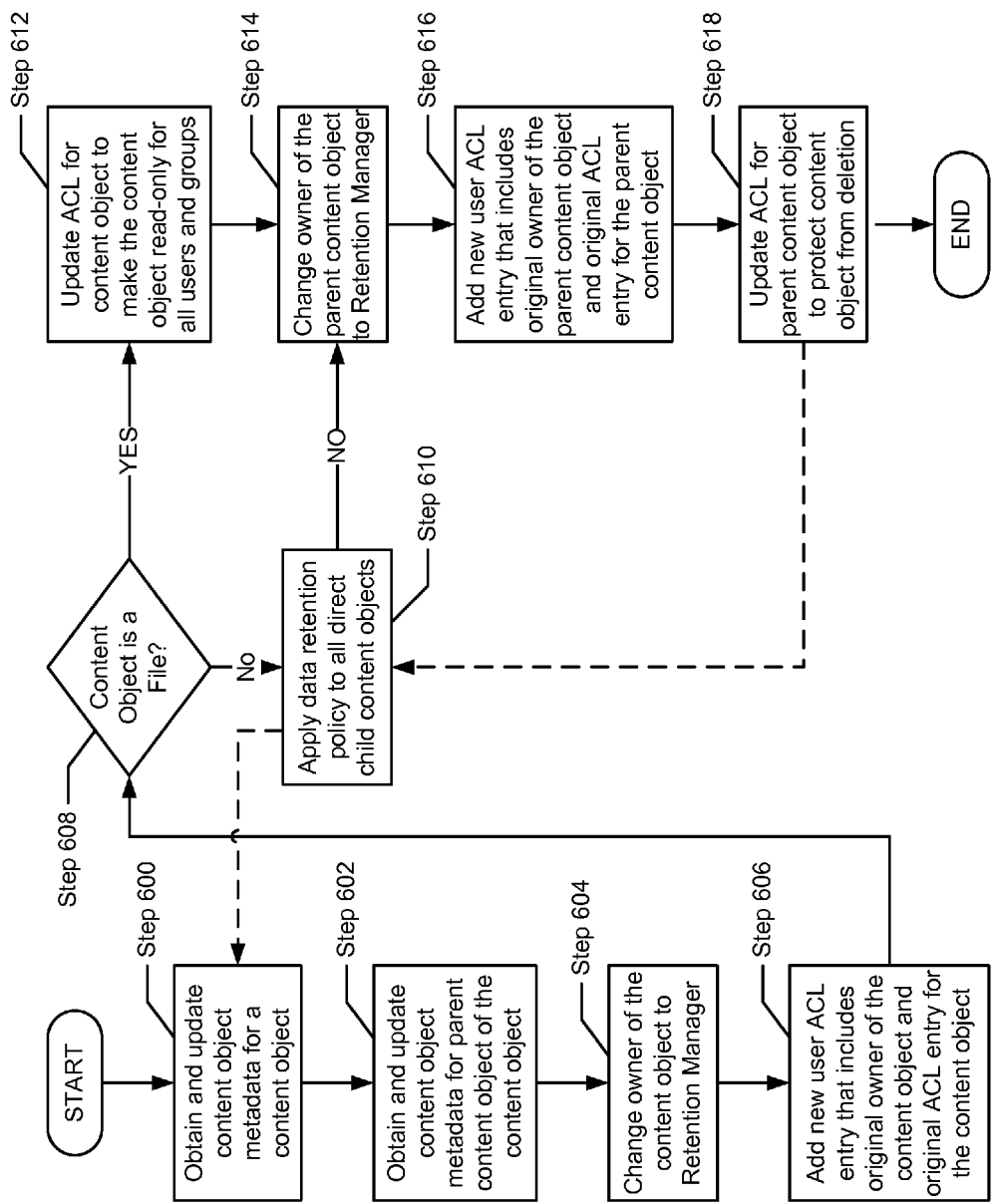

FIGS. 5 and 6 show a method for applying a data retention policy in accordance with one or more embodiments of the technology.

Turning to FIG. 5, in step 500, a master command is generated by the content object retention management controller (100). The master command may specify a managed-entity object ID (204) and a data retention policy. In one embodiment of the technology, the master command may be generated in response to an administrator (or another individual), or by an automated process, requesting the application of a data retention policy on a proxy object. In response to the request, the content object retention management controller may obtain the corresponding proxy object from the master-side repository and apply the data retention policy to the proxy object in order to obtain an updated proxy object. The updated proxy object may be maintained in memory until step 524. The MEO ID is subsequently obtained from the proxy object and then used to generate the master command.

In step 502, the master command is sent to the broker component (110). In step 504, the broker component determines the appropriate cluster connector component to process the master command. In one embodiment of the technology, the master-side content object retention management layer (104) is able to connect to a number of different slave-side content object retention management layers. In such cases, the master-side content object retention management layer includes a cluster connector component for each of the different slave-side content object retention management layers, the broker component includes functionality to select the appropriate cluster connector component. In one embodiment of the technology, the selected cluster connector component is the cluster connector component that includes the necessary functionality to generate and send slave commands to the slave-side content object retention management layer that includes the MEO (i.e., the MEO corresponds to the MEO ID in the master command) in its slave-side repository.

In step 506, the cluster connector component receives the master command from the broker component and subsequently processes the master command to generate one or more slave commands. In one embodiment of the technology, the slave command(s) include: (i) the MEO ID, (ii) the data retention policy (the format of which may be modified in order for it to be processed by the slave-side content object retention management layer), (iii) cluster connection information (obtained from the configuration object, described above), which includes the information necessary for the slave-side content object retention management layer to connect to the computer cluster.

In step 508, the cluster connector component sends the slave command to the slave-side content object retention management layer. In step 510, the slave-side interface receives the slave command(s) and sends the slave command(s) to the command execution manager. In step 512, the command execution manager, after receiving the slave command(s), identifies the MEO using the MEO ID in the slave command(s), generates instructions for the MEO retention manager to apply the data retention policy (that is included in the slave command) to the MEO identified by the MEO ID, and issues instructions to the MEO retention manager.

In step 514, the MEO retention manager receives the instructions from the command execution manager and proceeds to obtain the MEO (using the MEO ID) from the slave-side repository.

In step 516, the MEO retention manager subsequently updates one or more portions of the MEO (e.g., one or more portions (214-220 in the MEO) based on the data retention policy. At this stage, the updated MEO is not committed back to the slave-side repository; rather, the updated MEO is maintained in memory until step 522.

In step 518, the MEO retention manager sends a request (s) to the content object retention manager to apply the data retention policy (which may be in a format that may be processed by the content object retention manager). In one embodiment of the technology, the request may include a set of content object IDs, where the set of content object IDs are obtained from the MEO (i.e., the MEO obtained in Step 514).

In step 520, the content object retention manager applies the data retention policy to the content objects specified in the request received from the MEO retention manager. Additional detail about step 520 is provided below in FIG. 6

In step 522, after receiving a notification that the data retention policy has been applied to the content objects in the computer cluster, the content object retention manager commits the updated content object metadata (see FIG. 6, steps 600, 602) to the slave-side repository and the MEO retention manager commits the updated MEO to the slave-side repository.

In step 524, slave-side content object retention management layer issues a notification to the master-side content object retention management layer that the data retention policy has been applied to the MEO. The master-side content object retention management layer subsequently notifies the content object retention management controller that the data retention policy has been applied to the MEO. At this stage, the content object retention management controller may commit the updated proxy object (discussed above) to the master-side repository.

Turning to FIG. 6, FIG. 6 shows a method for applying the data retention policy to the content objects. The method shown in FIG. 6 may be performed for each content object that is associated with the MEO (i.e. the MEO obtained in step 514). In step 600, the content object retention manager obtains content object metadata for a content object (i.e., a content object whose content object ID is present in the MEO (i.e., the MEO obtained in step 514)) from the slave-side repository. The content object retention manager subsequently updates the content object metadata in accordance with the data retention policy. For example, the following portions of the content object metadata may be updated: (i) "managed?" attribute (228) is updated to "true"; (ii) "retention policy applied?" attribute (230) is updated to "true"; (iii) retention expiry date (234) is updated to the expiry date as defined in the data retention policy, which is now being applied, only if its retention expiry period is longer than the retention expiry date currently set for the content object; (iv) retainer count (236) is incremented by "1"; (v) directly applied retainer count (244) is incremented by "1"; and (vi) the managed-entity IDs (248) is updated to include the MEO ID (i.e., the MEO ID used to obtain the MEO in step 514). At this stage, the updated content object metadata for the content object is not committed back to the slave-side repository; rather, the updated content object metadata for the content object is maintained in memory until step 522. In one embodiment of the technology, the content object retention manager may obtain the content object metadata from the computer cluster in the event that all or a portion of the content object metadata is not present in the slave-side repository. In such cases, the content object metadata obtained from the computer cluster may include the original ACL (which includes the ACL entries) associated with the content object.

In step 602, the content object retention manager obtains content object metadata for a parent content object of the content object (i.e., a content object whose content object ID is present in the MEO (i.e., the MEO obtained in step 514)) from the slave-side repository. The content object retention manager subsequently updates the content object metadata for the parent content object in accordance with the data retention policy. For example, the directly retained child content object IDs (250) may be updated to include the content object ID for the child content object (i.e., the content object corresponding to the content object metadata obtained in step 600). At this stage, the updated content object metadata for the parent content object is not committed back to the slave-side repository; rather, the updated content object metadata for the parent content object is maintained in memory until step 522. In one embodiment of the technology, the content object retention manager may obtain the content object metadata for the parent content object from the computer cluster in the event that all or a portion of the content object metadata for the parent content object is not present in the slave-side repository. In such cases, the content object metadata for the parent content object obtained from the computer cluster may include the original ACL (which includes the ACL entries) associated with the parent content object.

In step 604, the content object retention manager issues a command to the computer cluster to change the current owner of the content object (i.e., the content object identified using the content object ID) to the Retention Manager (or another entity that is managing the data retention policy). At this stage the owner of the content is Retention Manager and is no longer the entity that was specified as the owner of the content object prior to step 604.

In step 606, the content object retention manager issues a command to the computer cluster to add a new access control list (ACL) entry for content object (i.e., the content object identified using the content object ID), where the new ACL entry includes the owner of the content object (i.e., the owner of the content object prior to step 604) and the original ACL entry for this owner of the content object (i.e., the ACL entry associated with the owner of the content object prior to step 604).

In step 608, a determination is made about whether the content object is a file. If the content object is the file, then the process proceeds to step 612. If the content object is a directory (i.e., not a file) then the process proceeds to step 610.

In step 610, the data retention policy is applied to all direct child content objects of the content object whose content object metadata was obtained in step 600. Further, in the event that the direct child content object is a directory, the data retention policy may also be applied to all indirect child content objects associated with any of the direct child content objects. More specifically, in one embodiment of the technology, a depth first traversal, starting at the content object, is performed in a recursive manner such that the data retention policy is applied to all direct child content objects of the content object and all indirect child content objects of the content object. The depth first traversal is completed when the data retention policy is applied to all of the aforementioned child content objects. Applying the data retention policy to a child content object that is a directory (or subdirectory) may include performing steps 600, 604, 606, and 610 for the child content object when the child content object is a directory or subdirectory, and performing steps 602, 614, 616, and 618 for the parent content object of the child content object. Applying the data retention policy to a child content object that is a file may include performing steps 600, 604, 606, and 612 for the child content object when the child content object is a file and performing steps 602, 614, 616, and 618 for the parent content object of the child content object. For example, if the content object is a directory "/proc" and the directory "/proc" includes the subdirectory "/test3" and subdirectory "/test3" includes a text file "test1.txt", then step 610 includes applying data retention policy to direct child content object subdirectory "/test3" and indirect child content object file "test1.txt".

Those skilled in the art will appreciate that a given content object may include one level of direct child content objects and zero, one or more levels of indirect child content objects. Regardless of the number of direct and indirect child content objects, step 610 includes applying the data retention policy to all direct and indirect child content objects.

Continuing with the discussion of FIG. 6, in step 612, in the event that the content object (i.e., the content object associated with the content object metadata obtained in step 600) is a file, then the content object retention manager issues a command to the computer cluster to update ACL for the content object to make the content object read-only for all users and groups.

In step 614, the content object retention manager issues a command to the computer cluster to change the owner of the parent content object to the Retention Manager (or another entity that is managing the data retention policy).

In step 616, the content object retention manager issues a command to the computer cluster to add a new access control list (ACL) entry for parent content object where the new ACL entry includes the original owner (or most recent owner prior to step 614) of the parent content object and the original ACL entry for the original owner (or most recent owner prior to step 614) of the parent content object.

In step 618, the content object retention manager issues a command to the computer cluster to update the ACL of the parent content object to protect the content object from being deleted. In one embodiment of the technology, step 618 includes setting a "sticky bit" on the parent content object (e.g., a directory). Once the sticky bit is set, the computer cluster may interpret the sticky bit as preventing deletion or movement of content objects (including files and subdirectories) from the directory by everyone except a superuser, the current owner of the content object whose content object metadata was obtained in step 600, or current owner of the parent content object for the aforementioned content object. Other mechanisms may be used in step 618 without departing from the technology.

After the completion of step 618, the data retention policy has been applied to the content object in the computer cluster. As discussed above, the process shown in FIG. 6 may be performed for each content object whose content object ID is stored in the MEO (i.e., the MEO obtained in step 514). Once the data retention policy has been applied to all content objects associated with the aforementioned MEO, the process may then proceed to step 522. An example of one implementation of the method shown in FIG. 6 is described below in Example 2.

In one embodiment of the technology, if a given content object is associated with multiple managed-entity objects where each of the managed-entity objects is associated with a different data retention policy, then the content object retention manager includes functionality to ensure that the content object is protected in a manner that: (i) satisfies both data retention policies or (ii) satisfies the most stringent of the data retention policies. For example, assume that a set of 100 emails stored in the computer cluster on Jan. 1, 2015 is associated with a first managed-entity object associated with a first data retention policy which indicates that these emails should not be deleted until Jan. 1, 2016. At a later point in time, five emails in the set of 100 emails is associated with a second managed-entity object associated with a second data retention policy which indicates that these emails are the subject to a litigation hold and, as such, should not be deleted until such time as the litigation has been terminated. In this scenario, both data retention policies will be applied to the five emails because they are associated with both the first and second MEO; however, the second data retention policy will take precedence over the first data retention policy when determining the retention expiry date of the five emails. In the event that the litigation is terminated prior to Jan. 1, 2016 and either the second managed-entity object is removed from the system or the second data retention policy is removed from the second managed-entity object, then the first data retention policy is applied to these five emails as they are still associated with the first managed-entity object.

In one embodiment of the technology, when a data retention policy for a given managed-entity object is removed, the data retention policy that was implemented on the associated content objects may be reversed (i.e., the associated content object metadata (including its ACL) may revert back to the state prior to application of any data retention policy provided that the aforementioned content objects are not associated with any other data retention policy. For example, the owner of the content object may be changed back to the original owner and the ACL associated with the content object may revert back to the original ACL. Further, the administrator (or another individual) may delete content object associated with a proxy object by deleting the proxy object from the master-side repository. The deletion of the proxy object may trigger the deletion of the corresponding managed-entity object and the corresponding content object metadata in the slave-side repository and the deletion of the associated content objects in the computer cluster. In one embodiment of the technology, when a data retention policy associated with a proxy object expires, one or more of the following may occur: (i) deletion of the proxy object from the master-side repository is initiated; (ii) the MEO associated with the proxy object is deleted (where this may be triggered by (i)); (iii) the content objects associated with the MEO are deleted from the computer cluster (provided that the content objects are not currently protected by any other data retention policy); (iv) the content object metadata for the content objects deleted in (iii) are deleted from the slave-side repository; and (v) the proxy object is deleted from the master-side repository only after receiving a confirmation that the corresponding MEO has been deleted The following examples are for explanatory purposes only and are not intended to limit the scope of the technology.

Example 1

Consider a scenario in which the computer cluster includes the following content object "/poc/test3/test1.txt" and the administrator wants to apply a data retention policy to this content object to prevent deletion of this content object until Jan. 31, 2016 12:00:00. Initially, a managed-entity object (MEO) is created and stored in the slave-side repository. The content of the MEO is shown in Table 1 below.

TABLE 1

Initial MEO Content

| Field | Value |
| --- | --- |
| Managed-entity ID | 0123456789012 |
| Managed? | False |
| Retention Policy Applied? | False |
| Hold Applied? | False |
| Retention Expiry Date | 0 |
| Content Object ID | /poc/test3/test1.txt |
| Retainer Count | 0 |

A proxy object is subsequently created and stored in the master-side repository, where the proxy object includes the MEO ID: 0123456789012. After the proxy object is created and stored in the master-side repository, the MEO is updated to reflect that it is now managed. Table 2 shows the updated content of the MEO.

TABLE 2

Updated MEO Content

| Field | Value |
| --- | --- |
| Managed-entity ID | 0123456789012 |
| Managed? | True |

TABLE 2-continued

Updated MEO Content

| Field | Value |
| --- | --- |
| Retention Policy Applied? | False |
| Hold Applied? | False |
| Retention Expiry Date | 0 |
| Content Object ID | /poc/test3/test1.txt |
| Retainer Count | 0 |

The administrator subsequently requests that a data retention policy be applied to the proxy object. The request initiates the generation of a master command. The content of at least a portion of the master command is shown in Table 3.

TABLE 3

Master Command Content

| Fields | Values |
| --- | --- |
| MEO ID | 0123456789012 |
| Data Retention Policy | I. Apply retention to MEO with MEO ID = 0123456789012<br>II. The retention period will expire on 31st Jan. 2016 12:00:00 |

As described in FIG. 5, the master command is ultimately routed to the appropriate cluster connector component. The cluster connector component subsequently generates at least one slave command. The content of at least a portion of slave command is shown in Table 4.

TABLE 4

Slave Command Contents

| Fields | Values |
| --- | --- |
| MEO ID | 0123456789012 |
| Instructions | I. Apply retention to MEO with MEO ID = 0123456789012<br>II. The retention period will expire on 31st Jan. 2016 12:00:00 |
| Cluster Connection Information | I. IP Address of the host machine where Namenode is running.<br>II. Login Credentials<br>III. Protocol (whose default value is "hdfs")<br>IV. Port number |

The slave command(s) is then sent to the slave-side content object retention management layer, where it is processed by the command execution manager. At least a portion of the instructions generated by the command execution manager based on the processing of the slave commands is shown in Table 5.

TABLE 5

Instructions to Managed-Entity Object Retention Manager

| Inst. No. | Instructions sent to Managed-Entity Object Retention Manager |
| --- | --- |
| I. | Apply retention to MEO with MEO ID = 0123456789012. |
| II. | This retention period will expire on 31$^{st}$ Jan. 2016 at 12:00:00. |
| III. | Use cluster connection information to connect with computer cluster |

The instructions are then sent to the MEO retention manager. In this example, the MEO retention manager uses the MEO ID in the instructions to obtain the corresponding MEO from the slave-side repository. The content of at least a portion of the MEO is shown in Table 2 above. The data retention policy is applied to the MEO which results in at least a portion of the MEO being updated. The updated MEO, after application of the data retention policy, is shown in Table 6.

TABLE 6

Updated MEO Content After Data Retention Policy Applied

| Field | Value |
| --- | --- |
| Managed-entity ID | 0123456789012 |
| Managed? | True |
| Retention Policy Applied? | True |
| Hold Applied? | False |
| Retention Expiry Date | 31$^{st}$ Jan. 2016 12:00:00 |
| Content Object ID | /poc/test3/test1.txt |
| Retainer Count | 1 |

The MEO retention manager then requests the content object retention manager to apply the data retention policy to "/poc/test3/test1.txt". The MEO retention manager also provides the content object retention manager with the cluster connector information.

The content object retention manager subsequently retrieves the content object metadata for "/poc/test3/test1.txt" (See Table 7) and the content object metadata for "/poc/test3/" (i.e., the parent content object metadata) (See Table 9). The data retention policy is applied to the content object "/poc/test3/test1.txt", which results in the content object metadata for the content object being updated (see Table 8) and the content object metadata for the parent content object ("/poc/test3/") being updated. (See Table 10).

TABLE 7

Retrieved Content Object Metadata for "/poc/test3/test1.txt"

| Field | Value | | |
| --- | --- | --- | --- |
| Content Object ID | /poc/test3/test1.txt | | |
| Managed? | False | | |
| Retention Policy Applied? | False | | |
| Hold Applied? | False | | |
| Retention Expiry Date | 0 | | |
| Retainer Count | 0 | | |
| Parent Content Object ID | /poc/test3 | | |
| Content Type | file | | |
| Original Content Object ACL | OWNER_NAME | contribUsr1 | |
| | GROUP_OWNER | contribGrp1 | |
| | ACL_ENTRIES | user::rw-, | |
| | | group::rw-, | |
| | | mask::rw-, | |
| | | other::rw- | |
| | Sticky_Bit Status | 0 | |
| Directly Applied Retainer Count | 0 | | |
| Inherited Applied Retainer Count | 0 | | |
| Managed-Entity ID | — | | |

TABLE 8

Updated Content Object Metadata for "poc/test3/test1.txt"

| Field | Value | | |
| --- | --- | --- | --- |
| Content Object ID | /poc/test3/test1.txt | | |
| Managed? | True | | |
| Retention Policy Applied? | True | | |
| Hold Applied? | False | | |
| Retention Expiry Date | 31$^{st}$ Jan. 2016 12:00:00 | | |
| Retainer Count | 1 | | |

TABLE 8-continued

Updated Content Object Metadata for "poc/test3/test1.txt"

| Field | Value | | |
| --- | --- | --- | --- |
| Parent Content Object ID | /poc/test3 | | |
| Content Type | file | | |
| Original Content Object ACL | OWNER_NAME | contribUsr1 | |
| | GROUP_OWNER | contribGrp1 | |
| | ACL_ENTRIES | user::rw-, | |
| | | group::rw-, | |
| | | mask::rw-, | |
| | | other::rw- | |
| | Sticky_Bit Status | 0 | |
| Directly Applied Retainer Count | 1 | | |
| Inherited Applied Retainer Count | 0 | | |
| Managed-Entity ID | [0123456789012] | | |

TABLE 9

Retrieved Content Object Metadata for "/poc/test3/"

| Field | Value | | |
| --- | --- | --- | --- |
| Content Object ID | /poc/test3/ | | |
| Managed? | False | | |
| Retention Policy Applied? | False | | |
| Hold Applied? | False | | |
| Retention Expiry Date | 0 | | |
| Retainer Count | 0 | | |
| Parent Content Object ID | /poc | | |
| Content Type | Directory | | |
| Original Content Object ACL | OWNER_NAME | contribUsr1 | |
| | GROUP_OWNER | contribGrp1 | |
| | ACL_ENTRIES | user::rwx, | |
| | | group::rwx, | |
| | | mask::rwx, | |
| | | other::r-x | |
| | Sticky_Bit Status | 0 | |
| Directly Applied Retainer Count | 0 | | |
| Inherited Applied Retainer Count | 0 | | |
| Managed-Entity ID | — | | |
| Directly Retained Child Content Object IDs | — | | |

TABLE 10

Updated Content Object Metadata for "/poc/test3/"

| Field | Value | | |
| --- | --- | --- | --- |
| Content Object ID | /poc/test3/ | | |
| Managed? | False | | |
| Retention Policy Applied? | False | | |
| Hold Applied? | False | | |
| Retention Expiry Date | 0 | | |
| Retainer Count | 0 | | |
| Parent Content Object ID | /poc | | |
| Content Type | Directory | | |
| Original Content Object ACL | OWNER_NAME | contribUsr1 | |
| | GROUP_OWNER | contribGrp1 | |
| | ACL_ENTRIES | user::rwx, | |
| | | group::rwx, | |
| | | mask::rwx, | |
| | | other::r-x | |
| | Sticky_Bit Status | 0 | |
| Directly Applied Retainer Count | 0 | | |
| Inherited Applied Retainer Count | 0 | | |
| Managed-Entity ID | — | | |
| Directly Retained Child Content Object IDs | /poc/test3/test1.txt | | |

Figure 7A:
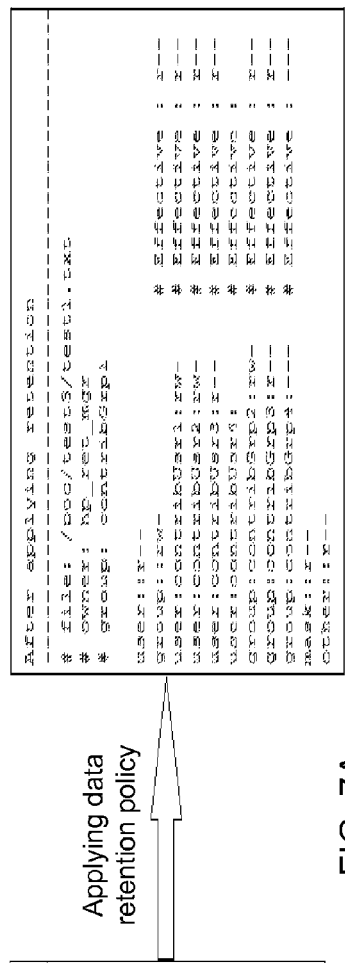
FIGS. 7A and 7B show examples in accordance with one or more embodiments of the technology.
Figure 7B:
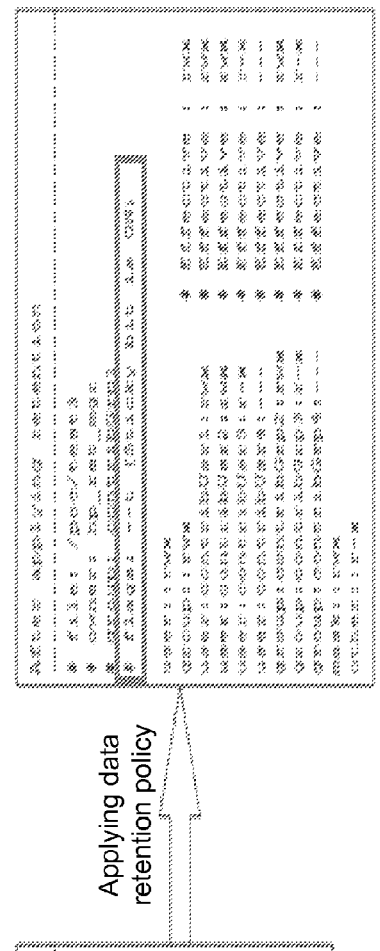

Once the content object metadata for the content object (i.e., /poc/test3/test1.txt) and content object metadata for the parent content object (i.e., /poc/test3/) are updated (as shown above in Tables 8 and 10), the content object retention manager issues the instructions to the computer cluster (using the cluster connection information) to implement the data retention policy on the content object (i.e., /poc/test3/test1.txt) in accordance with FIG. 6. FIG. 7A shows the ACL (which includes the ACL entries) for the content object in the computer cluster before and after application of the data retention policy. FIG. 7B shows the ACL (which includes the ACL entries) for the parent content object in the computer cluster before and after application of the data retention policy on the content object (i.e., /poc/test3/test1.txt).

Once the data retention policy has been successfully applied to the content object in the computer cluster, the updated content object metadata for the content object and the parent content object (see Tables 8 and 10) along with the updated MEO (see Table 6) are committed to the slave-side repository. The content object retention management controller is subsequently notified as described in FIG. 6.

Example 2

Consider a scenario in which there are four content objects: D-1, F-1-1, D-1-2, and F-1-2-1, where D-1 is a directory, F-1-1 is file stored in D-1, D-1-2 is a subdirectory in D-1, and F-1-2-1 is a file stored in D-1-2.

For purposes of this scenario assume that D-1 is directly associated with a managed-entity object named MEO-1, which has been registered with a proxy object named P-1. At some point in time, an administrator attempts to apply a data retention policy ("DRP") to P-1, which ultimately triggers the application of the DRP to D-1 via MEO-1 as described, e.g., in FIG. 5. The following discussion details one embodiment of the application of the DRP to the four content objects in accordance with FIG. 6 after the MEO retention manager sends one or more requests to the CO retention manager to apply the DRP to D-1 (see e.g., FIG. 5, step 518).

Upon receipt of the request(s), the CO retention manager performs the following steps:

1. Step 600 is performed for D-1. The result of performing this step is that the content object metadata for D-1 is obtained and is updated. The updated content metadata for D-1 includes the following information: managed?=true, "retention policy applied?"=true, "retention expiry date"="24$^{th}$ Feb 2016", "retainer count"=1, "directly applied retainer count=1", MEO_IDs={MEO-1}.
2. Step 602 is performed for the parent content object of D-1. The result of performing this step is that the content object metadata for the parent content object of D-1 is obtained and is updated. The updated content metadata for the parent content object of D-1 includes the following information: "directly retained child content object IDs"={D-1}.
3. Step 604 is performed for D-1. The result of performing this step is that the owner of D-1 is changed to "Retention Manager."
4. Step 606 is performed for D-1. The result of performing this step is the addition of a new ACL entry to the ACL of D-1 that provides the original owner of D-1 the same permissions on D-1 as the original owner possessed before application of data retention policy.
5. Step 608 is performed for D-1. The result of performing this step is that D-1 is determined to be a directory.
6. Step 610 is performed for D-1. The result of performing this step is the initiation of the application of the data retention policy to all direct child content objects of D-1. As discussed above, the direct child content objects of D-1 include F-1-1 and D-1-2. Accordingly, FIG. 6 is performed for each of the aforementioned child content objects. In this example assume that F-1-1 is processed first followed by D-1-2.
  6.1. Step 600 is performed for F-1-1. The result of performing this step is obtaining and updating the content object metadata for F-1-1. The updated content object metadata may include the following information: managed?=true, "retention policy applied?"=true, "retention expiry date"="24$^{th}$Feb 2016", "retainer count"=1, "directly applied retainer count"=0, "inherited applied retainer count"=1, MEO_IDs={ }.
  6.2. Step 602 is performed for the parent content object of F-1-1. The result of performing this step is obtaining and, if appropriate, updating the content object metadata for the parent content object. In this example, an update of the content object metadata for D-1, which is parent content object of F-1-1 is not required because its child, i.e., F-1-1, has inherited the data retention policy, i.e., "directly retained child content object IDs" for D-1={ }.
  6.3. Step 604 is performed for F-1-1. The result of performing this step is that the owner of F-1-1 is updated to Retention Manager.
  6.4. Step 606 is performed on F-1-1. The result of performing this step is the addition of a new ACL entry to the ACL of F-1-1 that provides the original owner of F-1-1 the same permissions on F-1-1 as the original owner possessed before application of data retention policy.
  6.5. Step 608 is performed for F-1-1. The result of performing this step is that F-1-1 is determined to be a file.
  6.6. Step 612 is performed for F-1-1. The result of performing this step is that the ACL for F-1-1 is updated to make F-1-1 read-only for all users and groups.
  6.7. Steps 614 and Steps 616 are executed on D-1 (i.e., parent content object of F-1-1), if required. In this example, these steps are not executed for D-1 because they have already been executed on D-1 during [3] and [4] above.
  6.8. Step 618 is executed on D-1 (i.e., the parent content object of F-1-1), if required. In this example, the ACL of D-1 is updated in a manner that ensures that the child content objects of D-1 (which includes F-1-1) are protected from deletion. At this stage, the data retention policy has been applied to F-1-1. Per [6] above, the data retention policy is now applied to D-1-2.
7. Step 600 is performed for D-1-2. The result of performing this step is obtaining and updating the content object metadata for D-1-2. The updated content object metadata may include the following information: managed?=true, "retention policy applied?"=true, "retention expiry date"="24$^{th}$ Feb 2016", "retainer count"=1, "directly applied retainer count=0", "inherited applied retainer count"=1, MEO_IDs={ }.
  7.1. Step 602 is performed for the parent content object of D-1-2. The result of performing this step is obtaining, and if appropriate, updating the content object metadata for the parent content object. In this example, an update of the content object metadata for D-1, which is the parent content object of D-1-2 is not required because D-1-2 has inherited this data retention policy, i.e., "directly retained child content object IDs" for "D-1" is ={ }.
  7.2. Step 604 is performed for D-1-2. The result of performing this step is that the owner of D-1-2 is updated to Retention Manager.
  7.3. Step 606 is performed on D-1-2. The result of performing this step is the addition of a new ACL entry to the ACL of D-1-2 that provides the original owner of D-1-2 the same permissions on D-1-2 as the original owner possessed before application of data retention policy.

7.4. Step 608 is performed for D-1-2. The result of performing this step is that D-1-2 is determined to be a directory.

7.5. Step 610 is performed for D-1-2. The result of performing this step is the initiation of the application of the data retention policy to all direct child content objects of D-1-2. As discussed above, the direct child content object of D-1-2 is F-1-2-1. Accordingly, FIG. 6 is performed for F-1-2-1.

7.5.1. Step 600 is performed for F-1-2-1. The result of performing this step is obtaining and updating the content object metadata for F-1-2-1. The updated content object metadata may include the following information: managed?=true, "retention policy applied?"=true, "retention expiry date"="24$^{th}$ Feb 2016", "retainer count"=1, "directly applied retainer count"=0, "inherited applied retainer count"=1, MEO_IDs=

7.5.2. Step 602 is performed for the parent content object of F-1-2-1. The result of performing this step is obtaining and, if appropriate, updating the content object metadata for the parent content object. In this example, an update of the content object metadata for D-1-2, which is parent content object of F-1-2-1 is not required because its child, i.e., F-1-2-1, has inherited the data retention policy, i.e., "directly retained child content object IDs" for D-1-2={ }.

7.5.3. Step 604 is performed for F-1-2-1. The result of performing this step is that the owner of F-1-2-1 is updated to Retention Manager.

7.5.4. Step 606 is performed on F-1-2-1. The result of performing this step is the addition of a new ACL entry to the ACL of F-1-2-1 that provides the original owner of F-1-2-1 the same permissions on F-1-2-1 as the original owner possessed before application of data retention policy.

7.5.5. Step 608 is performed for F-1-2-1. The result of performing this step is that F-1-2-1 is determined to be a file.

7.5.6. Step 612 is performed for F-1-2-1. The result of performing this step is that the ACL for F-1-2-1 is updated to make F-1-2-1 read-only for all users and groups.

7.5.7. Steps 614 and Steps 616 are executed on D-1-2 (i.e. parent content object of F-1-2-1), if required. In this example, these steps are not executed for D-1-2 because they have already been executed on D-1-2 during [7.2] and [7.3] above.

7.5.8. Step 618 is executed on D-1-2 (i.e., the parent content object of F-1-2-1), if required. In this example, this steps is performed on D-1-2, which is parent of F-1-2-1 to ensure that F-1-2-1 is protected from deletion. At this stage, the data retention policy has been applied to F-1-2-1. At this stage, step 610 for D-1-2 (see [7.5]) is now completed.

7.6. Step 614 and Step 616 are performed on D-1 (i.e., the parent content object of D-1-2), if required. In this example, these steps are not required to be executed on D-1 as they have already been performed in [3] and [4] above.

7.7. Step 618 is performed on D-1 (i.e., the parent content object of D-1-2), if required. In this example, this step is not required as it was previously performed in [6.8]. At this stage, the data retention policy has been applied to D-1-2. At this stage, step 610 is now completed for D-1.

8. Steps 614 and 616 are executed on the parent content object of D-1. The result of performing this step is that the owner of parent content object of D-1 is changed to Retention Manager and a new ACL entry is added to ACL of the parent content object of D-1. The new ACL entry grants the original owner of the parent content object of D-1 the same set of permission that it possessed for the parent content object of D-1 prior to the application of the data retention policy on D-1.

9. Step 618 is executed on the parent content object of D-1. The result of performing this step is a change in the ACL of the parent content object of D-1 to protect its child content objects (which includes D-1) from deletion. At this stage, the data retention policy has been applied to D-1. This process then proceeds to step 522 in FIG. 5.

Embodiments of the technology may be implemented on a computing system. Any combination of mobile, desktop, server, embedded, or other types of hardware may be used. For example, as shown in FIG. 8, the computing system (800) may include one or more computer processor(s) (802), associated memory (804) (e.g., random access memory (RAM), cache memory, flash memory, etc.), one or more storage device(s) (806) (e.g., a hard disk, an optical drive such as a compact disk (CD) drive or digital versatile disk (DVD) drive, a flash memory stick, etc.), and numerous other elements and functionalities. The computer processor(s) (802) may be an integrated circuit for processing instructions. For example, the computer processor(s) may be one or more cores, or micro-cores of a processor. The computing system (800) may also include one or more input device(s) (810), such as a touchscreen, keyboard, mouse, microphone, touchpad, electronic pen, or any other type of input device. Further, the computing system (800) may include one or more output device(s) (808), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (800) may be connected to a network (812) (e.g., a local area network (LAN), a wide area network (WAN) such as the Internet, mobile network, or any other type of network) via a network interface connection (not shown). The input and output device(s) may be locally or remotely (e.g., via the network (812)) connected to the computer processor(s) (802), memory (804), and storage device(s) (806). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code, that when executed by a processor(s), is configured to perform embodiments of the technology.

Further, one or more elements of the aforementioned computing system (800) may be located at a remote location and connected to the other elements over a network (812). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

What is claimed is:

1. A method for applying data retention policies, comprising:
   receiving a request for applying a data retention policy (DRP) to a proxy object;
   in response to the request:
      providing, by a content object retention management controller, a master command to a master-side content object retention management layer, wherein the master command comprises a managed-entity object (MEO) identifier (ID) and the DRP, wherein the proxy object is associated with a MEO identified by the MEO ID;
      generating, by the master-side content object retention management layer, a slave command based on the master command;
      issuing, by the master-side content object retention management layer, the slave command to a slave-side content object retention management layer (SCORML) comprising a MEO retention manager and a content object (CO) retention manager;
      obtaining, by the MEO retention manager, the MEO using the MEO ID;
      applying the DRP to the MEO, wherein applying the DRP to the MEO comprises modifying at least a portion of the MEO;
      determining, by the MEO retention manager and using the MEO, at least one content object associated with the MEO;
      obtaining, by the CO retention manager, content object metadata for the at least one content object;
      applying the DRP to the content object metadata for the at least one content object, wherein applying the DRP to the content object metadata for the at least one content object comprises modifying at least a portion of the content object metadata; and
      issuing, by the CO retention manager, at least one instruction to a distributed file system to apply the DRP to the at least one content object stored in the distributed file system.

2. The method of claim 1, further comprising:
   receiving, by the CO retention manager, after issuing the at least one instruction to the distributed file system, a confirmation that the DRP has been applied to the at least one content object stored in the distributed file system;
   after receiving the confirmation:
      committing the modification to at least the portion of the content object metadata;
      committing the modification to at least the portion of the MEO; and
      notifying the master-side content object retention management layer that the DRP has been applied to the MEO.

3. The method of claim 1, wherein the proxy object comprises the MEO ID.

4. The method of claim 1, wherein the DRP specifies a retention period.

5. The method of claim 1, wherein the MEO comprises the MEO ID, a retention expiry date, and a content object ID associated with the at least one content object.

6. The method of claim 5, wherein the MEO further comprises a first attribute used to indicate that the MEO is associated with the proxy object, and a second attribute used to indicate that the DRP is applied to the MEO.

7. The method of claim 1, wherein the content object is one selected from a group consisting of a file stored in the distributed file system and an object in the distributed file system.

8. The method of claim 1, wherein the distributed file system is Hadoop Distributed File System (HDFS) executing in a computer cluster and wherein the at least one content object is stored in a physical node in the computer cluster.

9. The method of claim 1, modifying at least the portion of the MEO comprises:
   setting an attribute in the MEO to indicate that the DRP has been applied to the MEO; and
   setting a retention expiry date in the MEO based on the DRP.

10. The method of claim 1, wherein modifying at least the portion of the content object metadata comprises:
    setting an attribute in the content object metadata to indicate that the DRP has been applied to the content object; and
    setting a retention expiry date in the content object metadata based on the DRP.

11. The method of claim 1, further comprising:
    updating the content object metadata for a parent content object of the at least one content object to include a content object identifier of the at least one content object.

12. The method of claim 1, wherein the at least one instruction to the distributed file system to apply the DRP instructs the distributed file system to at least:
    change an owner of the content object to a retention manager;
    add a new user access control (ACL) entry for the content object that specifies the original owner of the content object and an original ACL entry for original owner of the content object; and
    make the content object read-only, wherein the content object is a file.

13. The method of claim 12, wherein the at least one instruction to the distributed file system to apply the DRP instructs the distributed file system to further:
    change an owner of the parent content object of the content object to the retention manager;
    add a new user access control (ACL) entry for the parent content object that specifies the original owner of the parent content object and an original ACL entry for the original owner of the parent content object; and
    update an ACL of the parent content object to prevent deletion of the content object.

14. A non-transitory computer readable medium comprising computer readable program code, which when executed by a computer processor enables the computer processor to:
    receive a request for applying a first data retention policy (DRP) to a proxy object;
    in response to the request:
       provide, by a content object retention management controller, a master command to a master-side content object retention management layer, wherein the master command comprises a managed-entity object (MEO) identifier (ID) and the first DRP, wherein the proxy object is associated with a MEO identified by the MEO ID;

generating, by the master-side content object retention management layer, a slave command based on the master command;

issuing, by the master-side content object retention management layer, the slave command to a slave-side content object retention management layer (SCORML) comprising a MEO retention manager and a content object (CO) retention manager;

obtain, by the MEO retention manager, the MEO using the MEO ID;

apply the first DRP to the MEO, wherein applying the first DRP to the MEO comprises modifying at least a portion of the MEO;

determine, by the MEO retention manager and using the MEO, at least one content object associated with the MEO;

obtain, by the CO retention manager, content object metadata for at least the one content object;

apply the first DRP to the content object metadata for the at least one content object, wherein applying the first DRP to the content object metadata for the at least one content object comprises modifying at least a portion of the content object metadata; and issue, by the CO retention manager, at least one instruction to a distributed file system to apply the first DRP to the at least one content object stored in the distributed file system.

15. The non-transitory computer readable medium of claim 14, wherein the at least one content object is associated with a second DRP.

16. The non-transitory computer readable medium of claim 15, wherein the second DRP specifies that the at least one content object is not to be deleted after a retention expiry date associated with the first DRP.

17. The non-transitory computer readable medium of claim 14, wherein the at least one content object is associated with a second MEO and wherein the second MEO is associated with a second proxy object.

18. A system, comprising:
a content object retention management controller configured to:
receive a request for applying a data retention policy (DRP) to a proxy object;
in response to the request, provide a master command to a master-side content object retention management layer, wherein the master command comprises a managed-entity object (MEO) identifier (ID) and the DRP, wherein the proxy object is associated with a MEO identified by the MEO ID;
a master-side repository comprising the proxy object;
the master-side content object retention management layer configured to:
receive the master command;
generate a slave command based on the master command;
issue the slave command to a slave-side content object retention management layer (SCORML) comprising a MEO retention manager and a content object (CO) retention manager;
the slave-side content object retention management layer configured to:
obtain, by the MEO retention manager, the MEO using the MEO ID;
apply the DRP to the MEO, wherein applying the DRP to the MEO comprises modifying at least a portion of the MEO;
determine, by the MEO retention manager and using the MEO, at least one content object associated with the MEO;
obtain, by the CO retention manager, content object metadata for at least the one content object;
apply the DRP to the content object metadata for the at least one content object, wherein applying the DRP to the content object metadata for the at least one content object comprises modifying at least a portion of the content object metadata; and
issue, by the CO retention manager, at least one instruction to a distributed file system to apply the DRP to the at least one content object;
a computer cluster comprising a plurality of physical nodes and implementing the distributed file system, wherein the at least one content object is stored on one of the plurality of physical nodes and wherein the distributed file system is configured to, in response to the at least one instruction, apply the DRP to the at least one content object.

19. The system of claim 18, wherein the MEO comprises the MEO ID, a retention expiry date, and a content object ID associated with the at least one content object, a first attribute used to indicate that the MEO is associated with the proxy object, and a second attribute used to indicate that the DRP is applied to the MEO.

20. The system of claim 18, wherein the content object is one selected from a group consisting of a file stored in the distributed file system and an object in the distributed file system and wherein the distributed file system is Hadoop Distributed File System (HDFS).

* * * * *